US009411573B2

(12) United States Patent
Dhanda

(10) Patent No.: US 9,411,573 B2
(45) Date of Patent: Aug. 9, 2016

(54) TESTING FRAMEWORK FOR APPLICATIONS

(71) Applicant: Google Inc., Mountain View, CA (US)

(72) Inventor: Sanjeev Dhanda, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 343 days.

(21) Appl. No.: 13/649,282

(22) Filed: Oct. 11, 2012

(65) Prior Publication Data

US 2014/0109066 A1 Apr. 17, 2014

(51) Int. Cl.
G06F 9/445 (2006.01)
G06F 11/36 (2006.01)
G06F 11/34 (2006.01)
G06Q 30/02 (2012.01)

(52) U.S. Cl.
CPC .............. *G06F 8/65* (2013.01); *G06F 11/3476* (2013.01); *G06F 11/3495* (2013.01); *G06F 11/3664* (2013.01); *G06F 8/62* (2013.01); *G06F 11/3409* (2013.01); *G06F 2201/865* (2013.01); *G06F 2201/875* (2013.01); *G06Q 30/0282* (2013.01)

(58) Field of Classification Search
CPC ............... G06F 8/65; G06F 8/67; G06F 8/68; G06F 11/1433; G06F 8/60
See application file for complete search history.

(56) References Cited

U.S. PATENT DOCUMENTS 7,334,005 B2 * 2/2008 Sobel
7,818,736 B2 * 10/2010 Appavoo et al. ............. 717/168
8,978,015 B2 * 3/2015 Pechanec ............ G06F 11/3672
717/126
2008/0301660 A1 * 12/2008 Rao et al. ...................... 717/170
2009/0210921 A1 8/2009 Ramsdell
2010/0087184 A1 4/2010 Stoev et al.
2010/0161506 A1 6/2010 Bosenick et al.
2010/0281475 A1 11/2010 Jain et al.
2011/0040996 A1 2/2011 Hackborn et al.
2011/0099230 A1 4/2011 Inapakolla et al.
2011/0161825 A1 6/2011 Tierney et al.
2011/0296383 A1 * 12/2011 Pasternak ............ G06F 11/3688
717/124
2012/0233312 A1 9/2012 Ramakumar et al.

OTHER PUBLICATIONS

Apptimize, "AB Testing for Android and IOS", Available at: apptimize.com/index.html. Date visited: Aug. 19, 2013; 18 pages.
ISR and Written Opinion dated Mar. 6, 2014, for PCT/US2013/063465.
First Substantive Examination Report for European Application 13780009.0 dated Mar. 15, 2016.

* cited by examiner

*Primary Examiner* — Chuck Kendall
(74) *Attorney, Agent, or Firm* — Morris & Kamlay LLP

(57) ABSTRACT

An application distribution server may be operable to select a plurality of data processing devices which are capable of receiving application updates. One or more experimental versions of an application may be communicated by the application distribution server to each of the selected plurality of data processing devices during an update process of the application. The application distribution server may cause collection of performance information associated with the one or more experimental versions. The application distribution server may then cause communication of the collected performance information to a developer of the application for analysis. When a particular experimental version is uninstalled from a particular data processing device or when feedback and/or rating information on the particular experimental version is communicated from the particular data processing device, the application distribution server may communicate, to the particular data processing device, a message indicating an experiment and options to opt-out of future experiments.

16 Claims, 4 Drawing Sheets

TESTING FRAMEWORK FOR APPLICATIONS

FIELD

Certain embodiments of the disclosure relate to mobile application testing. More specifically, certain embodiments of the disclosure relate to a method and system for a testing framework for applications.

BACKGROUND

Website owners or developers have used A/B testing or split testing for testing the performance of different website versions with respect to each other. In the context of a website, during the A/B testing process, some users of the website page or application may get slightly modified version(s). The website owner or developer may verify how each modification affects the usability and/or user's behavior compared to a baseline control version. Developers of applications such as, for example, mobile applications, on the other hand, may not have an easy way to experiment with new features on their applications. In general, users of an application need to download the application onto their devices such as mobile devices from, for example, an application distribution server. The application users may not have advanced information about a new feature when upgrading the application with the new feature. In instances when the upgraded application no longer supports their devices, the users may have to contact the developer of the application for a fix, for example. A bad application release may lead to lots of negative reviews from the users, for example.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for a testing framework for applications. In various embodiments of the disclosure, an application distribution server may comprise a plurality of applications which may be downloaded and/or installed onto data processing devices such as, for example, smart phones, mobile phones and/or tablets. The application distribution server may select a plurality of data processing devices which are capable of receiving application updates associated with an application. One or more experimental versions of the application may then be communicated, by the application distribution server, to each of the selected plurality of data processing devices, during an update process of the application. The application distribution server may cause collection of performance information associated with the communicated one or more experimental versions. The application distribution server may then cause communication of the collected performance information to a developer of the application for analysis.

Various advantages, aspects and novel features of the present disclosure, as well as details of an illustrated embodiment thereof, will be more fully understood from the following description and drawings.

DETAILED DESCRIPTION

Figure 1:
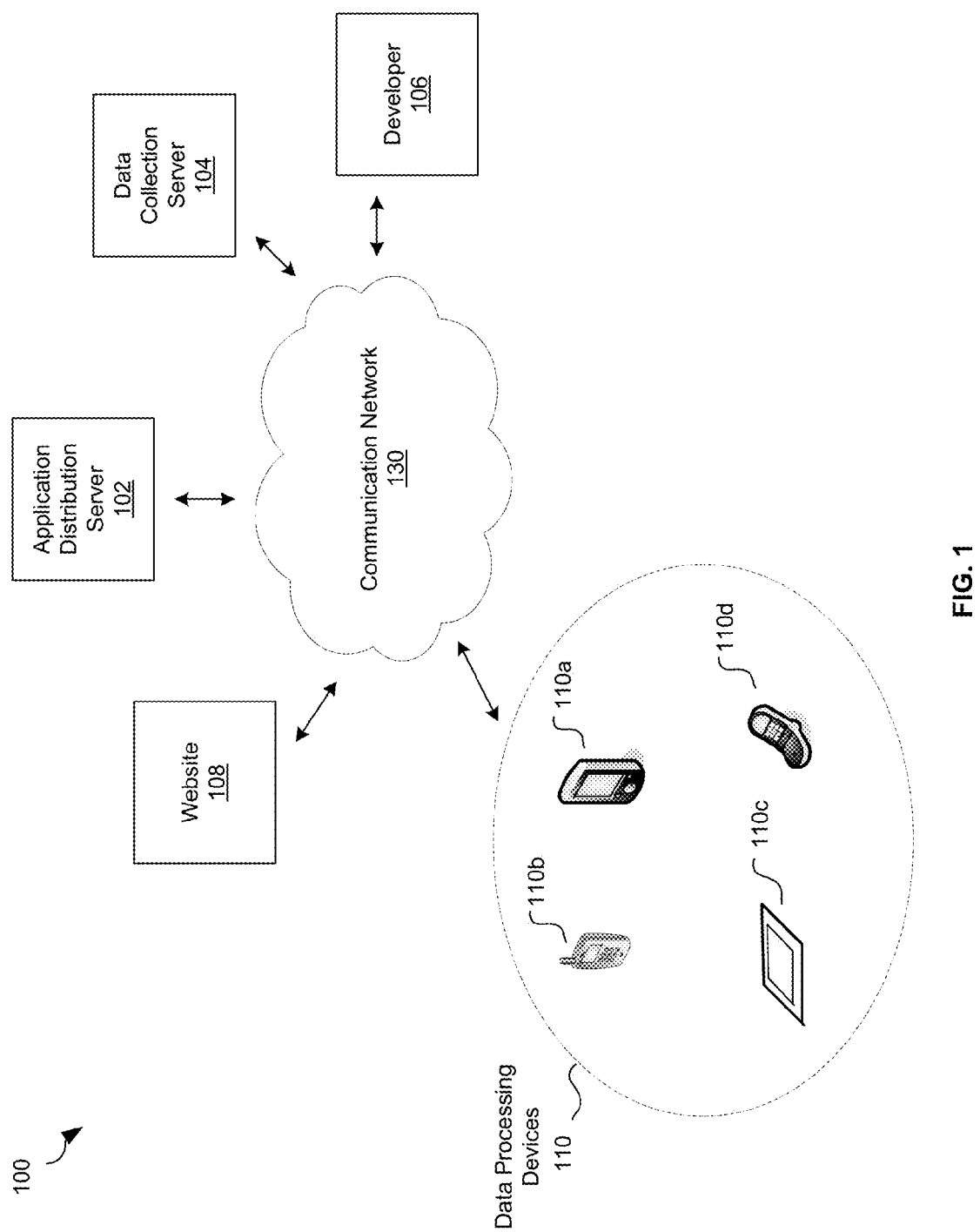
FIG. 1 is a block diagram illustrating an example communication system, in accordance with an embodiment of the disclosure.

Certain embodiments of the disclosure can be found in a method and system for a testing framework for applications. Certain specific details are set forth in the following description and in drawings to provide a thorough understanding of various embodiments of the disclosure. One skilled in the art, however, will understand that additional embodiments of the present disclosure may be practiced without several of the details described in the following description.

In various embodiments of the disclosure, an application distribution server may be operable to select a plurality of data processing devices which are capable of receiving application updates associated with an application. One or more experimental versions of the application may be communicated by the application distribution server to each of the selected plurality of data processing devices during an update process of the application. The application distribution server may be operable to cause collection of performance information associated with the communicated one or more experimental versions. The application distribution server may then be operable to cause communication of the collected performance information to a developer of the application for analysis.

In instances when a particular experimental version is uninstalled from a particular data processing device among the selected plurality of data processing devices, the application distribution server may be operable to communicate, to the particular data processing device, a message indicating that the particular data processing device is on an experiment for the application and options to opt-out of future experiments associated with the particular data processing device. In instances when feedback information and/or rating information on a particular experimental version may be communicated from a particular data processing device among the selected plurality of data processing devices, the application distribution server may also be operable to communicate, to the particular data processing device, a message indicating that the particular data processing device is on an experiment for the application and options to opt-out of future experiments associated with the particular data processing device.

In an example embodiment of the disclosure, the plurality of data processing devices may be capable of receiving the application updates automatically (e.g., via automatic updates). At least a portion of the performance information may be collected by each of the selected plurality of data processing devices, for example. In some instances, at least a portion of the performance information may be collected by the application running on each of the selected plurality of data processing devices with the one or more experimental versions, for example. In other instances, at least a portion of the performance information may be collected by the application distribution server, for example. The collected performance information may then be communicated to a data collection server, for example. The data collection server may be operable to aggregate the communicated performance information. The aggregated performance information may then be communicated from the data collection server to the developer.

In an example embodiment of the disclosure, the application may be downloaded onto one or more of the selected plurality of data processing devices from the application distribution server. The application may also be downloaded onto one or more of the selected plurality of data processing devices from a website, for example.

FIG. 1 is a block diagram illustrating an example communication system, in accordance with an embodiment of the disclosure. Referring to FIG. 1, there is shown an application distribution server 102, a data collection server 104, a website 108, a communication network 130 and a plurality of data processing devices 110, of which data processing devices 110a-110d are illustrated.

The application distribution server 102 may comprise suitable logic, circuitry, interfaces and/or code that may be operable to publish and/or distribute applications, for example, to the data processing devices 110. In an example embodiment of the disclosure, a developer 106 of an application may utilize the application distribution server 102 to communicate or distribute one or more experimental versions of the application to a plurality of selected data processing devices such as the data processing devices 110a-110d for testing the one or more experimental versions. The one or more experimental versions of the application may be distributed to the data processing devices 110a-110d via, for example, application update processes.

The data collection server 104 may comprise suitable logic, circuitry, interfaces and/or code that may be operable to receive performance information associated with one or more experimental versions of an application, where the one or more experimental versions may be associated with and running on a plurality of selected data processing devices such as the data processing devices 110a-110d. The data collection server 104 may be operable to aggregate the received performance information and communicate or deliver the aggregated performance information to a developer 106 of the application. In an example embodiment of the disclosure, the performance information associated with the one or more experimental versions may be received from one or more of the data processing devices 110a-110d and/or from the application distribution server 102.

The website 108 may comprise suitable logic, circuitry, interfaces and/or code that may be operable to provide web page information and/or applications via, for example, the communication network 130 through an Internet address known as a uniform resource locator (URL). In an example embodiment of the disclosure, one or more applications may be downloaded onto one or more data processing devices 110a-110d from the website 108.

A data processing device such as the data processing device 110a may comprise suitable logic, circuitry, interfaces and/or code that may be operable to process data or signals. The data processing device 110a may be operable to communicate signals across the communication network 130. The data processing device 110a may comprise, for example, a smart phone, a mobile phone, a tablet and/or other similar type of device. In an example embodiment of the disclosure, one or more applications may be downloaded onto and running on the data processing device 110a. The data processing device 110a may be capable of receiving application updates associated with each of the one or more applications. In this regard, for example, the data processing device 110a may receive the application updates automatically.

The communication network 130 may comprise suitable logic, circuitry, interfaces, devices and/or code that may be operable to provide data and voice communication services to various devices and/or entities by using various wireless and/or wired communication technologies. The communication network 130 may comprise, for example, the Internet, a cellular network and/or other multimedia network. In an example embodiment of the disclosure, the communication network 130 may be operable to provide communications among the application distribution server 102, the data collection server 104, the website 108, the developer 106 and/or the plurality of data processing devices 110a-110d.

In operation, the application distribution server 102 may be operable to select a plurality of data processing devices, such as the data processing devices 110a-110d, which are capable of receiving application updates associated with an application. In this regard, for example, a selected data processing device such as the data process device 110a may be capable of receiving the application updates via a user account which is associated with the application distribution server 102 and the data processing device 110a. The plurality of data processing devices 110a-110d may be capable of receiving the application updates automatically or otherwise. One or more experimental versions of the application may be communicated by the application distribution server 102, for example, via the communication network 130, to each of the selected plurality of data processing devices 110a-110d during an update process of the application. The application distribution server 102 may be operable to cause collection of performance information associated with the communicated one or more experimental versions. In this regard, for example, at least a portion of the performance information may be collected by each of the selected plurality of data processing devices 110a-110d. In some instances, at least a portion of the performance information may be collected by the application running on each of the selected plurality of data processing devices 110a-110d with the one or more experimental versions, for example. In other instances, at least a portion of the performance information may be collected by the application distribution server 102 itself, for example. The performance information may comprise, for example, vital statistic data associated with running the one or more experimental versions of the application on each of the selected plurality of data processing devices 110a-110d.

The application distribution server 102 may then be operable to cause communication of the collected performance information to the developer 106 of the application for analysis. For example, the collected performance information may be communicated to the data collection server 104 from the selected plurality of data processing devices 110a-110d and/or from the application distribution server 102. The data collection server 104 may be operable to aggregate the received performance information and communicate, the aggregated performance information to the developer 106. The developer 106 may then analyze the received performance information. Based on a result of the analysis, the developer 106 may communicate with the application distribution server 102 for implementing an updated experiment for the application or for turning off the experiment for the application.

In instances when a particular experimental version is uninstalled from a particular data processing device, such as the data processing device 110a of the selected plurality of data processing devices 110a-110d, the application distribution server 102 may be operable to communicate, to the particular data processing device 110a, a message indicating that the particular data processing device 110a is on an experiment for the application and options to opt-out of future experiments associated with the particular data processing device 110a. In other instances when feedback information and/or rating information on a particular experimental version may be communicated from a particular data processing device, such as the data processing device 110a, among the selected plurality of data processing devices 110a-110d, the application distribution server 102 may also be operable to communicate, to the particular data processing device 110a, a message indicating that the particular data processing device 110a is currently running an experiment for the application and options to opt-out of future experiments associated with the particular data processing device 110a. In this regard, the options, when available, may comprise, for example, an option to opt-out of the particular experimental version of the application, an option to opt-out of all experimental versions of the application, an option to opt-out of any experimental version of any application running on the data processing device 110a, and an option to opt-out of any experimental version of any application associated with the user account which is associated with the data processing device 110a.

In an example embodiment of the disclosure, the application may be downloaded onto one or more of the selected plurality of data processing devices 110a-110d from the application distribution server 102. The application may also be downloaded onto one or more of the selected plurality of data processing devices 110a-110d from the website 108 and/or from any other suitable entity, for example.

Figure 2:
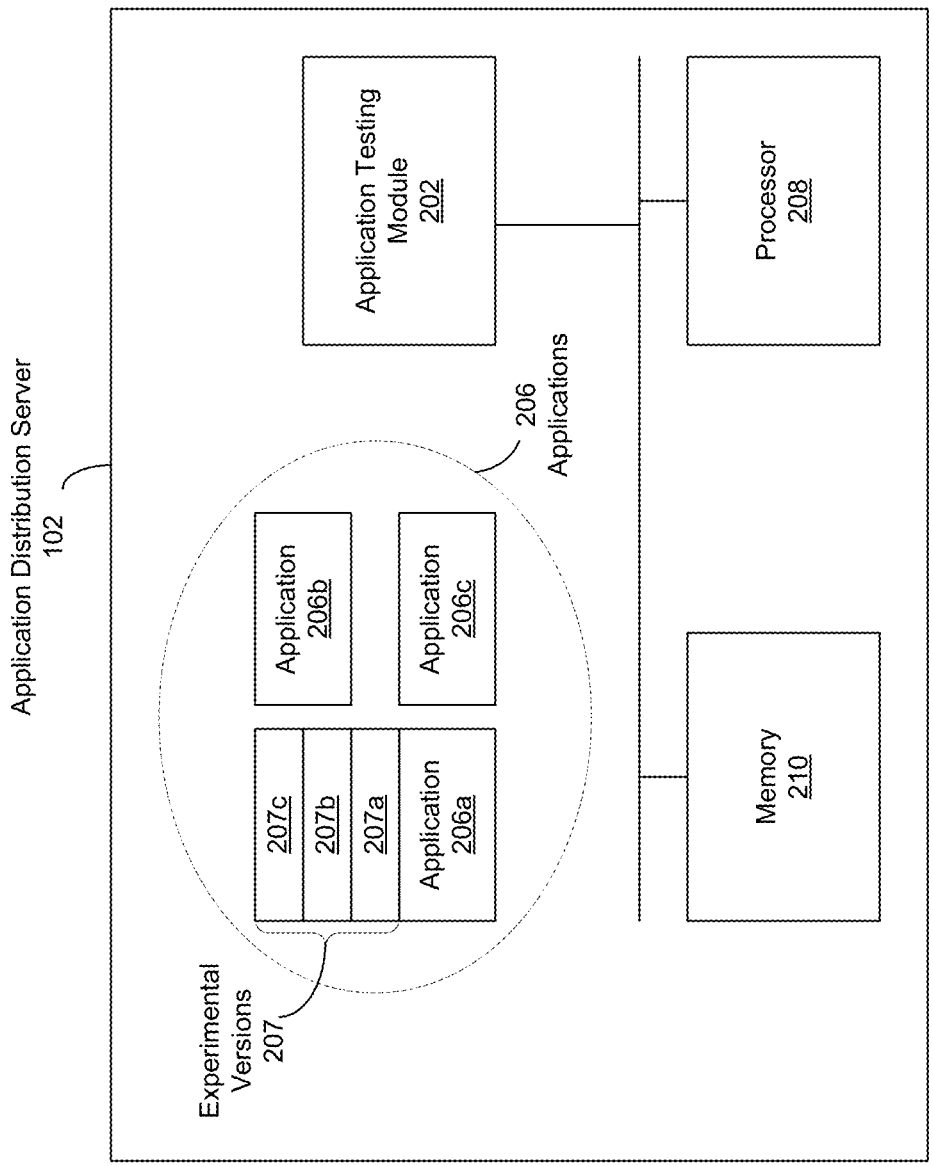
FIG. 2 is a block diagram illustrating an example application distribution server, in accordance with an embodiment of the disclosure.

FIG. 2 is a block diagram illustrating an example application distribution server, in accordance with an embodiment of the disclosure. Referring to FIG. 2, there is shown the application distribution server 102. The application distribution server 102 may comprise, for example, an application testing module 202, a processor 208 and a memory 210. The application distribution server 102 may comprise a plurality of published applications 206, of which applications 206a-206c are illustrated. There is also shown, in FIG. 2, a plurality of experimental versions 207 of the application 206a, of which experimental versions 207a-207c are illustrated. The application distribution server 102 may be as described with respect to FIG. 1, for example.

The application testing module 202 may comprise suitable logic, circuitry, interfaces and/or code that may be operable to perform application testing functions for the application distribution server 102. In an example embodiment of the disclosure, the application testing module 202 may be operable to select a plurality of data processing devices, such as the data processing devices 110a-110d, which are capable of receiving application updates associated with an application such as the application 206a. One or more experimental versions such as the experimental versions 207a-207c of the application 206a may be communicated or distributed by the application testing module 202 to each of the selected plurality of data processing devices 110a-110d during an update process of the application 206a. The application testing module 202 may be operable to cause collection of performance information associated with the communicated or distributed one or more experimental versions 207a-207c. The application testing module 202 may then be operable to cause communication of the collected performance information to a developer such as the developer 106 of the application 206a for analysis.

The processor 208 may comprise suitable logic, circuitry, interfaces and/or code that may be operable to manage and/or control operations of various components and/or modules in the application distribution server 102. The processor 208 may utilize an operating system (OS) that enables the execution of various applications such as, for example, the applications 206.

The memory 210 may comprise suitable logic, circuitry, interfaces and/or code that may be operable to store information such as executable instructions and/or data that may be utilized by the processor 208, the application testing module 202 and/or other modules or components in the application distribution server 102. The memory 210 may comprise RAM, ROM, low latency nonvolatile memory such as flash memory and/or other suitable electronic data storage.

In operation, the application testing module 202 may be operable to select the plurality of data processing devices 110a-110d, which are capable of receiving application updates associated with the application 206a. In this regard, for example, a selected data processing device such as the data process device 110a may be capable of receiving the application updates via a user account which is associated with the application distribution server 102 and the data processing device 110a. One or more experimental versions 207a-207c of the application 206a may be communicated or distributed by the application testing module 202, for example, via the communication network 130, to each of the selected plurality of data processing devices 110a-110d during an update process of the application 206a. The application testing module 202 may be operable to cause collection of performance information associated with the communicated or distributed one or more experimental versions 207a-207c. The application testing module 202 may then be operable to cause communication of the collected performance information to the developer 106 of the application 206a for analysis. For example, the collected performance information may be communicated to a data collection server such as the data collection server 104 from the selected plurality of data processing devices 110a-110d and/or from the application testing module 202 in the application distribution server 102. The data collection server 104 may be operable to aggregate the received performance information and communicate the aggregated performance information to the developer 106. The developer 106 may then analyze the received performance information. Based on a result of the analysis, the developer 106 may communicate with the application testing module 202 for implementing an updated experiment for the application 206a or for turning off the experiment for the application 206a.

In instances when a particular experimental version such as the experimental version 207a is uninstalled from a particular data processing device, such as the data processing device 110a of the selected plurality of data processing devices 110a-110d, the application testing module 202 may be operable to communicate, to the particular data processing device 110a, a message indicating that the particular data processing device 110a is currently running an experiment for the application 206a and options to opt-out of future experiments associated with the particular data processing device 1108. In other instances when feedback information and/or rating information on a particular experimental version such as the experimental version 207a may be communicated from a particular data processing device, such as the data processing device 110a, among the selected plurality of data processing devices 110a-110d, the application testing module 202 may also be operable to communicate, to the particular data processing device 110a, a message indicating that the particular data processing device 110a is currently running an experiment for the application 206a and options to opt-out of future experiments associated with the particular data processing device 110a. In this regard, the options, when available, may comprise, for example, an option to opt-out of the particular experimental version 207a of the application 206a, an option to opt-out of all experimental versions 207 of the application 206a, an option to opt-out of any experimental version of any application (e.g., application 206a, 206b or 206c) running on the data processing device 110a, and an option to opt-out of any experimental version of any application (e.g., application 206a, 206b or 206c) associated with the user account which is associated with the data processing device 110a.

Figure 3:
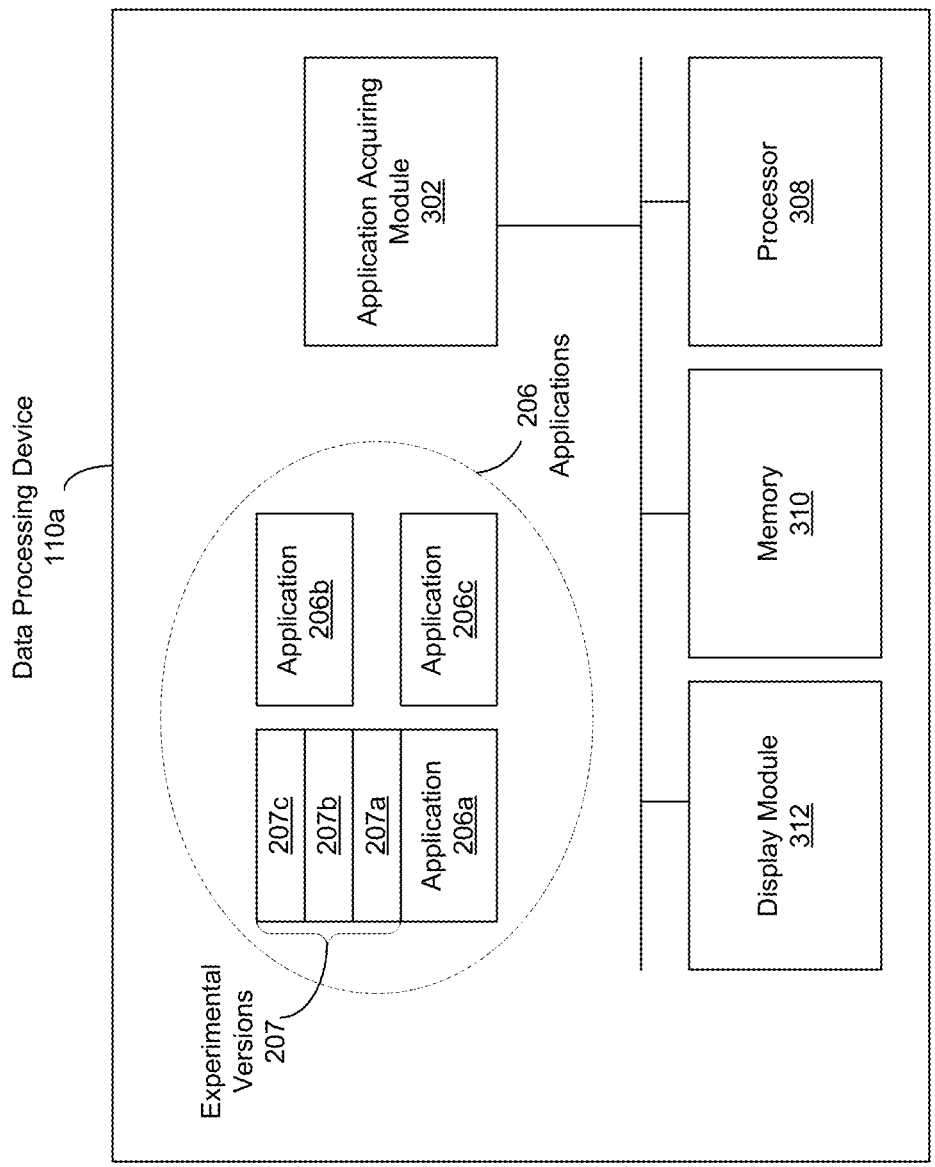
FIG. 3 is a block diagram illustrating an example data processing device, in accordance with an embodiment of the disclosure.

FIG. 3 is a block diagram illustrating an example data processing device, in accordance with an embodiment of the disclosure. Referring to FIG. 3, there is shown the data processing device 110a. The data processing device 110a may comprise, for example, an application acquiring module 302, a processor 306, a memory 310 and a display module 312. The data processing device 110a may comprise a plurality of downloaded application 206 running on the data processing device 110a, of which applications 206a-206c are illustrated. There is also shown, in FIG. 3, a plurality of downloaded experimental versions 207 of the application 206a, of which experimental versions 207-207c are illustrated. The data processing device 110a may be as described with respect to FIG. 1, for example.

The application acquiring module 302 may comprise suitable logic, circuitry, interfaces and/or code that may be operable to couple to a particular application distribution server such as the application distribution server 102. The application acquiring module 302 may be operable to acquire downloading of published applications such as, for example, the applications 206a-206c from the application distribution server 102. In an example embodiment of the disclosure, during an update process of a downloaded application such as the application 206a, one or more experimental versions 207-207c may be downloaded, via the application acquiring module 302, onto the data processing device 110a from the application distribution server 102, The processor 308 may comprise suitable logic, circuitry, interfaces and/or code that may be operable to manage and/or control operations of various components and/or modules in the data processing device 110a. The processor 308 may utilize an operating system (OS) that enables the execution of various applications such as, for example, the applications 206.

The memory 310 may comprise suitable logic, circuitry, interfaces and/or code that may be operable to store information such as executable instructions and/or data that may be utilized by the processor 308, the application acquiring module 302, the display module 312 and/or other modules or components in the data processing device 110a. The memory 310 may comprise RAM, ROM, low latency nonvolatile memory such as flash memory and/or other suitable electronic data storage.

The display module 312 may comprise suitable logic, circuitry, interfaces and/or code that may be operable to display or present processed content to a user of the data processing device 110a. In an example embodiment of the disclosure, the display module 312 may be operable to display a message communicated or received from the application distribution server 102. The message may indicate that the data processing device 110a is currently running an experiment for an application such as, for example, the application 206a. In such instances, the display module 312 may also display information on options to opt-out of future experiments, where the information on options may also be communicated or received from the application distribution server 102.

In operation, during an update process of the application 206a, the data processing device 110a may be operable to download, via, the application acquiring module 302, one or more experimental versions 207a-207c of the application 206a from the application distribution server 102. The processor 308 may be operable to install the downloaded one or more experimental versions 207a-207c of the application 206a. The data processing device 110a may be capable of receiving the application update via, for example, automatic updates. The data processing device 110a may be operable to collect performance information associated with the one or more experimental versions 207a-207c. In this regard, for example, at least a portion of the performance information may be collected by the processor 308. For example, the processor 308 may collect vital information such as battery consumption while running one of the experimental versions 207. The performance information collected by the processor 308 may then be communicated to, for example, a data collection server such as the data collection server 104.

At least a portion of the performance information may also be collected by the application 206a itself while implementing the one or more experimental versions 207a-207c. For example, the application 206a may utilize one or more counters to record and collect statistic data or information associated with the one or more experimental versions 207a-207c. The performance information collected by the application 206a may then be communicated to either the processor 308 or the application acquiring module 302, for example. In such instances, the processor 308 may in turn communicate the collected performance information to, for example, the data collection server 104. The application acquiring module 302 may in turn communicate the collected performance information to the application testing module 202 in the application distribution server 102, where the application testing module 202 may then communicate the collected performance information to, for example, the data collection server 102. At least a portion of the performance information may also be collected by the application distribution server 102 via the application acquiring module 302. In this regard, for example, the application acquiring module 302 may collect the vital information associated with running one of the experimental versions 207 and communicate the collected vital information to the application testing module 202 in the application distribution server 102. The performance information communicated to the application testing module 202 in the application distribution server 102 may then be communicated to, for example, the data collection server 104.

In instances when a particular experimental version such as the experimental version 207a is uninstalled from the data processing device 110a, the data processing device 110a may be operable to receive, via the application acquiring module 302, from the application testing module 202 in the application distribution server 102, a message indicating that the data processing device 110a is currently running an experiment for the application 206a, for example. In such instances, the data processing device 110a may also be operable to receive, via the application acquiring module 302, from the application testing module 202 in the application distribution server 102, options to opt-out of future experiments associated with the data processing device 110a, for example. In this regard, the message and/or the information on the options to opt-out may be displayed or presented via the display module 312 for the user of the data processing device 110a.

In instances when feedback information and/or rating information on a particular experimental version such as the experimental version 207a is given by the user and is communicated from the data processing device 110a, the data processing device 110a may also be operable to receive, via the application acquiring module 302 from the application testing module 202 in the application distribution server 102, a message indicating that the data processing device 110a is currently running an experiment for the application 206a, for example. In such instances, the data processing device 110a may also be operable to receive, via the application acquiring module 302, from the application testing module 202 in the application distribution server 102, options to opt-out of future experiments associated with the data processing device 110a, for example. In this regard, the message and/or the information on the options to opt-out may also be displayed or presented via the display module 312 for the user of the data processing device 110a.

In an example embodiment of the disclosure, the applications 206a-206c running on the data processing device 110a may be downloaded from, for example, the application distribution server 102 via the application acquiring module 302. The applications 206a-206c may also be downloaded from, for example, a website such as the website 108 and/or from any other suitable entity, via the processor 308.

Figure 4:
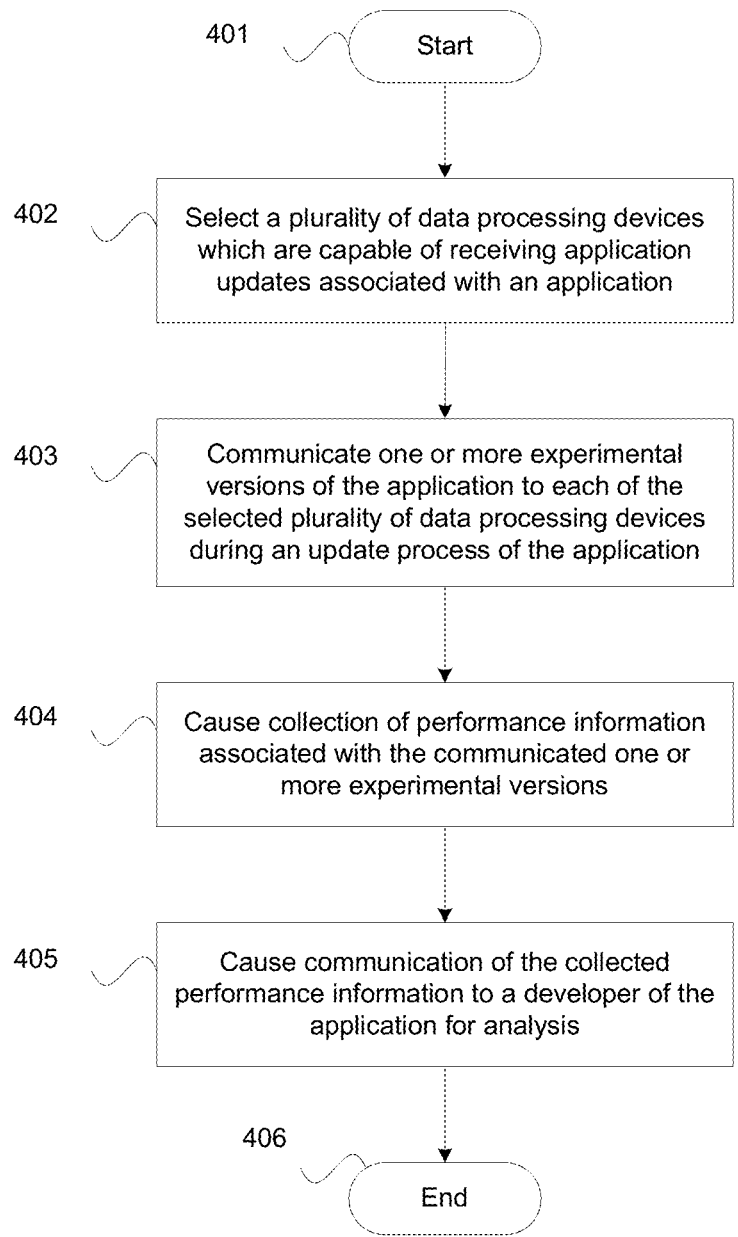
FIG. 4 is a flow chart illustrating example steps for a testing framework for applications, in accordance with an embodiment of the disclosure.

FIG. 4 is a flow chart illustrating example steps for a testing framework for applications, in accordance with an embodiment of the disclosure. Referring to FIG. 4, the example steps start at step 401. In step 402, the application testing module 202 in the application distribution server 102 may be operable to select the plurality of data processing devices 110a-110d, which are capable of receiving application updates associated with an application such as the application 206a. In step 403, one or more experimental versions 207a-207c of the application 206a may be communicated or distributed by the application testing module 202, for example, via the communication network 130, to each of the selected plurality of data processing devices 110a-110d during an update process of the application 206a. In this regard, for example, the one or more experimental versions 207a-207c may be distributed to the data processing device 110a via the application acquiring module 302 in the data processing device 110a. In step 404, the application testing module 202 may be operable to cause collection of performance information associated with the communicated or distributed one or more experimental versions 207a-207c of the application 206a. In step 405, the application testing module 202 may then be operable to cause communication of the collected performance information to the developer 106 of the application 206a for analysis. In this regard, for example, the collected performance information may be communicated to a data collection server such as the data collection server 104 from the selected plurality of data processing devices 110a-110d and/or from the application distribution server 102. The data collection server 104 may be operable to aggregate the received performance information and communicate the aggregated performance information to the developer 106. The developer 106 may then analyze the received performance information. The example steps may proceed to the end step 406.

In various embodiments of the disclosure, an application testing module 202 in an application distribution server 102 may be operable to select a plurality of data processing devices, such as the data processing devices 110a-110d, which are capable of receiving application updates associated with an application 206a. In this regard, for example, the plurality of data processing devices 110a-110d may be capable of receiving the application updates via automatic updates and/or other types of updates. One or more experimental versions 207a-207c of the application 206a may be communicated or distributed by application testing module 202 in the application distribution server 102 to each of the selected plurality of data processing devices 110a-110d during an update process of the application 206a. The application testing module 202 in the application distribution server 102 may be operable to cause collection of performance information associated with the communicated one or more experimental versions 207a-207c. In this regard, for example, at least a portion of the performance information may be collected by a processor such as the processor 308 in each of the selected plurality of data processing devices 110a-110d. In some instances, at least a portion of the performance information may be collected by the application 206a running on each of the selected plurality of data processing devices 110a-110d with the one or more experimental versions 207a-207c, for example. In other instances, at least a portion of the performance information may be collected by the application testing module 202 in the application distribution server 102 via an application acquiring module 302 in the data processing device 110a, for example.

The application testing module 202 in the application distribution server 102 may then be operable to cause communication of the collected performance information to a developer 106 of the application 206a for analysis. In this regard, for example, the collected performance information may be communicated to a data collection server 104 from the selected plurality of data processing devices 110a-110d and/or from the application distribution server 102. The data collection server 104 may be operable to aggregate the received performance information and communicate the aggregated performance information to the developer 106.

In instances when a particular experimental version such as the experimental version 207a is uninstalled from a particular data processing device, such as the data processing device 110a of the selected plurality of data processing devices 110a-110d, the application testing module 202 in the application distribution server 102 may be operable to communicate, to the particular data processing device 110a, a message indicating that the particular data processing device 110a is currently running an experiment for the application 206a and options to opt-out of future experiments associated with the particular data processing device 110a. In other instances when feedback information and/or rating information on a particular experimental version such as the experimental version 207a may be communicated from, a particular data processing device, such as the data processing device 110a, among the selected plurality of data processing devices 110a-110d, the application testing module 202 in the application distribution server 102 may also be operable to communicate, to the particular data processing device 110a, a message indicating that the particular data processing device 110a is currently running an experiment for the application and options to opt-out of future experiments associated with the particular data processing device 110a.

In some instances, the application 206a may be downloaded onto one or more of the selected plurality of data processing devices 110a-110d from the application distribution server 102. The application may also be downloaded onto one or more of the selected plurality of data processing devices 110a-110d from a website such as the website 108 and/or from any other suitable entity, for example.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a testing framework for applications.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in an application distribution server:
      selecting a plurality of data processing devices that are capable of receiving application updates associated with an application;
      communicating one or more experimental versions of the application to each of the selected plurality of data processing devices during an update process of the application;
      causing collection of performance information associated with the communicated one or more experimental versions;
      causing communication of the collected performance information to a developer of the application for analysis; and
      communicating, to one or more of the selected plurality of data processing devices, an option to opt-out of one or more future experimental versions of the application, wherein the option to opt-out of the one or more future experimental versions of the application is communicated to the one or more of the selected plurality of data processing devices upon an occurrence of an event selected from the group consisting of:
         an event in which a particular experimental version is uninstalled from the one or more of the selected plurality of data processing devices, and
         an event in which feedback information or rating information on a particular experimental version is communicated from the one or more of the selected plurality of data processing devices.

2. The method according to claim 1, wherein the plurality of data processing devices are capable of receiving the application updates via automatic updates.

3. The method according to claim 1, wherein at least a portion of the performance information is collected by each of the selected plurality of data processing devices.

4. The method according to claim 1, wherein at least a portion of the performance information is collected by the application running on each of the selected plurality of data processing devices with the one or more experimental versions.

5. The method according to claim 1, wherein at least a portion of the performance information is collected by the application distribution server.

6. The method according to claim 1, wherein:
   the collected performance information is communicated to a data collection server;
   the communicated performance information is aggregated by the data collection server for the developer; and
   the aggregated performance information is communicated from the data collection server to the developer.

7. The method according to claim 1, wherein the application is downloaded onto one or more of the selected plurality of data processing devices from the application distribution server.

8. The method according to claim 1, wherein the application is downloaded onto one or more of the selected plurality of data processing devices from a website.

9. A system, comprising:
   an application distribution server, wherein the application distribution server is operable to:
      select a plurality of data processing devices that are capable of receiving application updates associated with an application;
      communicate one or more experimental versions of the application to each of the selected plurality of data processing devices during an update process of the application;
      cause collection of performance information associated with the communicated one or more experimental versions;
      cause communication of the collected performance information to a developer of the application for analysis; and
      communicate, to one or more of the selected plurality of data processing devices, an option to opt-out of one or more future experimental versions of the application, wherein the option to opt-out of the one or more future experimental versions of the application is communicated to the one or more of the selected plurality of data processing devices upon an occurrence of an event selected from the group consisting of:
         an event in which a particular experimental version is uninstalled from the one or more of the selected plurality of data processing devices, and
         an event in which feedback information or rating information on a particular experimental version is communicated from the one or more of the selected plurality of data processing devices.

10. The system according to claim 9, wherein the plurality of data processing devices are capable of receiving the application updates via automatic updates.

11. The system according to claim 9, wherein at least a portion of the performance information is collected by each of the selected plurality of data processing devices.

12. The system according to claim 9, wherein at least a portion of the performance information is collected by the application running on each of the selected plurality of data processing devices with the one or more experimental versions.

13. The system according to claim 9, wherein at least a portion of the performance information is collected by the application distribution server.

14. The system according to claim 9, wherein;
the collected performance information is communicated to a data collection server;
the communicated performance information is aggregated by the data collection server for the developer; and
the aggregated performance information is communicated from the data collection server to the developer.

15. The system according to claim 9, wherein the application is downloaded onto one or more of the selected plurality of data processing devices from the application distribution server.

16. A method, comprising:
in an application distribution server:
selecting a plurality of data processing devices that are capable of receiving application updates associated with an application via automatic updates;
communicating one or more experimental versions of the application to each of the selected plurality of data processing devices during an automatic update process of the application;
causing collection of performance information associated with the communicated one or more experimental versions;
causing communication of the collected performance information to a developer of the application for analysis; and
communicating, to one or more of the selected plurality of data processing devices, an option to opt-out of one or more future experimental versions of the application, wherein the option to opt-out of the one or more future experimental versions of the application is communicated to the one or more of the selected plurality of data processing devices upon an occurrence of an event selected from the group consisting of:
an event in which a particular experimental version is uninstalled from the one or more of the selected plurality of data processing devices, and
an event in which feedback information or rating information on a particular experimental version is communicated from the one or more of the selected plurality of data processing devices.

\* \* \* \* \*